United States Patent
Kahn et al.

(10) Patent No.: US 8,972,541 B2
(45) Date of Patent: Mar. 3, 2015

(54) METHOD AND APPARATUS PROVIDING ACCESS NETWORK AWARE PRESENCE TO APPLICATIONS

(75) Inventors: Colin Kahn, Morris Plains, NJ (US); Alistair Urie, Issy-les-Moulineaux (FR)

(73) Assignee: Alcatel Lucent, Boulogne-Billancourt (FR)

( * ) Notice: Subject to any disclaimer, the term of this patent is extended or adjusted under 35 U.S.C. 154(b) by 549 days.

(21) Appl. No.: 12/705,203

(22) Filed: Feb. 12, 2010

(65) Prior Publication Data

US 2011/0202641 A1 Aug. 18, 2011

(51) Int. Cl.
*G06F 15/177* (2006.01)
*H04L 12/26* (2006.01)
*H04L 29/08* (2006.01)
*H04W 36/00* (2009.01)
*H04W 28/24* (2009.01)

(52) U.S. Cl.
CPC ........... *H04L 67/22* (2013.01); *H04W 36/0044* (2013.01); *H04L 67/322* (2013.01); *H04W 28/24* (2013.01)
USPC .......................................... 709/221; 370/252

(58) Field of Classification Search
USPC ............................. 709/220–226; 370/229–234
See application file for complete search history.

(56) References Cited

U.S. PATENT DOCUMENTS

| | | | |
|---|---|---|---|
| 7,856,226 B2 * | 12/2010 | Wong et al. | 455/414.1 |
| 7,990,913 B2 * | 8/2011 | Massiera et al. | 370/328 |
| 8,032,130 B2 * | 10/2011 | Reynolds et al. | 455/423 |
| 8,320,272 B2 * | 11/2012 | Kahn et al. | 370/252 |
| 2002/0160785 A1 * | 10/2002 | Ovesjo et al. | 455/453 |
| 2004/0174853 A1 * | 9/2004 | Saito et al. | 370/338 |
| 2006/0014539 A1 * | 1/2006 | Oh | 455/436 |
| 2007/0150480 A1 | 6/2007 | Hwang et al. | |
| 2008/0176552 A1 * | 7/2008 | Hamano et al. | 455/422.1 |
| 2008/0192638 A1 * | 8/2008 | Massiera et al. | 370/237 |
| 2009/0060028 A1 * | 3/2009 | Liu et al. | 375/240.01 |
| 2009/0219819 A1 * | 9/2009 | Haverinen et al. | 370/241 |
| 2010/0003975 A1 | 1/2010 | Barankanira et al. | |
| 2010/0103829 A1 * | 4/2010 | Murzeau et al. | 370/252 |

FOREIGN PATENT DOCUMENTS

| | | | | |
|---|---|---|---|---|
| EP | 1435748 | * | 7/2004 | H04Q 7/38 |
| EP | 1 708 526 A1 | | 10/2006 | |
| FR | 2 882 487 A1 | | 8/2006 | |
| JP | 2008219656 A | | 9/2008 | |

(Continued)

OTHER PUBLICATIONS

International Search Report and the Written Opinion of the International Searching Authority, or the Declaration, in PCT/US2001/024119, mailed Jun. 21, 2011, Alcatel-Lucent USA Inc., Applicant, 14 pages.

(Continued)

*Primary Examiner* — Shirley Zhang
(74) *Attorney, Agent, or Firm* — Wall & Tong, LLP

(57) ABSTRACT

A method and system for detecting and communicating access network capability information to an application server such that the application server may adapt its service offerings in response to changes in the access network associated with one or more user terminals. The service adaptations may comprise increases or decreases in service level, depending upon whether the access network capability has increased or decreased.

20 Claims, 3 Drawing Sheets

(56) References Cited

FOREIGN PATENT DOCUMENTS

JP      2009246875 A    10/2009
WO   WO 2009/011623 A   1/2009

OTHER PUBLICATIONS

Venkitaraman N et al: "Session aware network controlled interface selection for multi-homed hosts," Wireless Communications and Networking Conference, 2004. WCNC. 2004 IE EE Atlanta, GA, USA Mar. 21-25, 2004, Piscataway, NJ, USA, IEEE, vol. 4, Mar. 21, 2004, pp. 1963-1968, XP010708294, DOI: DOI: 10.1109/WCNC. 2004.1311386 ISBN: 978-0-7803-8344-9.

International Search Report and the Written Opinion of the International Searching Authority, or the Declaration, in PCT/IB2011/000479, mailed Jun. 24, 2011, Alcatel Lucent, Applicant, 7 pages.

English Translation of Notice of Rejection for Japanese Patent Application Serial No. 2012/552934, mailed Oct. 22, 2013, consists of 3 unnumbered pages.

English Translation of Notice of Preliminary Rejection for Korean Patent Application Serial No. 2012-7021146, mailed Nov. 4, 2013, pp. 1-3.

English Translation of Notice of Rejection for Japanese Patent Application Serial No. 2012-552492, mailed Jan. 7, 2014, consists of 3 unnumbered pages.

* cited by examiner

METHOD AND APPARATUS PROVIDING ACCESS NETWORK AWARE PRESENCE TO APPLICATIONS

CROSS REFERENCE TO RELATED APPLICATIONS

This application is related to simultaneously filed U.S. patent application Ser. No. 12/705,212 (now U.S. Pat. No. 8,320,272), entitled "Method And Apparatus For Controlling Access Technology Selection," which is herein incorporated by reference in its entirety.

FIELD OF THE INVENTION

The invention relates generally to the field of communication network management and, more specifically but not exclusively, to management of wireless communication networks.

BACKGROUND

Access devices such as smart phones, net books, laptops with wireless access and similar user equipment (UE) are increasingly capable of using multiple wireless and wireline connectivity options (e.g., GSM/GPRS, UMTS, LTE, WiFi, USB/wired, Ethernet and so on). The services that can be supported in a single device will increasingly vary depending on the connections that are available. Ignorance of the wireless connection technology by the application, particularly within the extended suite anchored in the 3GPP core network (GSM/GPRS, EGPRS, UMTS, LTE, HSPA, eHRPD, 3GPP WLAN) makes it difficult to support the service adaptation necessary to maintain high subscriber satisfaction.

The specific access network and technology used by the access device is selected according to a fixed preference list stored in the device, or according to a preference list transmitted by the access provider. The preferences are typically meant to ensure that service is provided via the subscriber's access provider or a partner provider. The access technology is selected primarily according to signal strength (coverage) considerations and, after being selected, is used to support all services requested by the user.

The concept of "presence" entails network and/or application awareness of UE reachability when accessing a network. When user equipment is reachable, content and services may be delivered from application servers, and peer applications may interact with the UE. In mobile networks, presence is currently is a binary concept from the perspective of applications—the UE is reachable by the application (such as within the context of an established session), or it is not reachable. The specific access technology and the resulting capabilities are hidden from the application behind a common IP anchor point.

Unfortunately, there is presently no mechanism to provide explicit access technology feedback to applications to allow them to adapt their processing to the capabilities and/or limitations of the access network, particularly when the access technology is hidden by an anchor point in the 3GPP core network.

Application servers or their proxies in content delivery networks, generally adapt their processing according to the available bandwidth in an access network as sensed by protocols at IOS layers above the Network Layer in the OSI Reference model. For example, at the Transport layer, TCP uses trial and error to estimate the available connection bandwidth and avoid congestion. The amount of data that TCP sends on a connection during a Round Trip Time (RTT) depends on the size of a "Congestion Window" that limits the number of packets that may be in transit. TCP congestion avoidance adapts the Congestion Window when packet loss occurs, continually making adjustments as bandwidth varies on a time scale associated with round-trip packet delay.

Another example is RTCP (RTP Control Protocol) which operates out of band at the Application Layer and is used for controlling RTP streams (typically over UDP). RTCP gathers statistics such as packet loss, jitter, and delay for a media connection. An application server may use this information to control the media stream so it is more compatible with the transmission network. Mechanisms such as adaptive streaming have been developed to support this. Examples include Microsoft Silverlight, Apple iPhone HTTP live streaming, Move Networks adaptive streaming, and Adobe: Real Time Messaging Chunk Stream Protocol (RTMCSP) among others.

None of these methods for controlling application interaction with the access network provides for an application to be explicitly aware of the access technology and its capabilities. This results in several deficiencies, including.

Adapting by trial and error. Only when the bandwidth of the available access network is exceeded and errors (packet drops, excessive delay, etc.) occur can the application adapt its processing.

Adapting the nature of the service rather than the rate at which packets are transported or the encoding of the packets is difficult. This is especially true in wireless networks because end-end measurements can not discern systematic throughput restrictions due to technology choice limitations from transient rate fluctuations due to mobile geometry and RF fading.

Access provider control over how applications interact with their access networks becomes more difficult. For example, "low value" applications which require high bandwidth may compete on shared channels (for example the air-interface) with "high value" applications that require less bandwidth. This can lead to degradation in performance for the high value application. In practice, service providers prefer to explicitly limit the high bandwidth applications supported on air-interface technologies that have limited bandwidth. This is not possible with a multi-technology capable device unless a means is provided to explicitly indicate the access method to a controlling function, or to the application.

BRIEF SUMMARY

Various deficiencies of the prior art are addressed by the present invention of a method and apparatus for providing access and access network specific information to applications, peers and content delivery systems communicating with a wireless access device capable of communicating via multiple access technologies.

A method according to one embodiment comprises communicating toward an application server and/or application client a signal indicative of a change in capability of an access network supporting delivery of corresponding application services to user equipment (UE), the change indicative signal configured to adapt the application server and/or application client to responsively modify delivered application services. The method may include detecting a change in capability of the access network at user equipment (UE) or provider equipment (PE). The access network may comprise a wireless access network. The application server and/or application client may adapt its service by increasing a service level or changing the suite of services offered in response to an increase of access network capability or decreasing a service level or changing the suite of services offered in response to a decrease of access network capability.

A system according to one embodiment comprises network equipment including a control function client adapted to communicate toward an application server and/or application client a signal indicative of a change in capability of an access network supporting delivery of corresponding application services to user equipment (UE), the change indicative signal configured to adapt the application server and/or application client to responsively modify delivered application services.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a wireless access device capable of communicating via a plurality of access technologies. However, those skilled in the art and informed by the teachings herein will realize that the invention is also applicable to any communication device in which multiple means of communications are available and different applications having different communication requirements may be invoked.

This invention enables application servers, application clients, content delivery systems and/or peer-to-peer applications to control their interaction with access networks of varying capabilities. Various embodiments allow applications to adapt their processing and service offering according to the type and capability of access networks available to end-user devices. By better matching application services to the capabilities of the available access networks, service offerings may be improved and the end-user experience enhanced.

An access technology aware presence, such as depicted in the various figures and described in more detail herein, provides a mechanism to inform applications of the access technology being used by user devices so applications can better adapt their transport and/or service offerings to the capabilities of the access network. For technologies that are anchored in the 3GPP core network ((GSM/GPRS, EGPRS, UMTS, LTE, HSPA, eHRPD, 3GPP WLAN and the like) it is not possible for the application to explicitly determine the technology of the underlying access network by examining packet headers. This is because applications send packets to, and receive packets from the common domain associated with the IP anchor point. That anchor point may be in the LTE EPC PGW, a UMTS/GPRS GGSN, a Home Agent, or other IP anchor point. The various embodiments provide several mechanisms to enable applications to become access network aware.

In one embodiment, explicit technology signaling is provided between an application and a server in the network that is aware of the access network technology. The network server may be in the wireless service provider core network, or it may reside external to the core network. In either case it may reside co-located on the same platform with other network elements, or it may be hosted on a standalone platform.

In another embodiment, explicit technology signaling is provided between an application and an end-user device/client, the signaling is optionally provided via a network server operating as an intermediary.

As a result of the provided signaling, access technology aware applications may autonomously adapt their processing to better match the capabilities of the access network to which the user device is currently attached.

Figure 1:
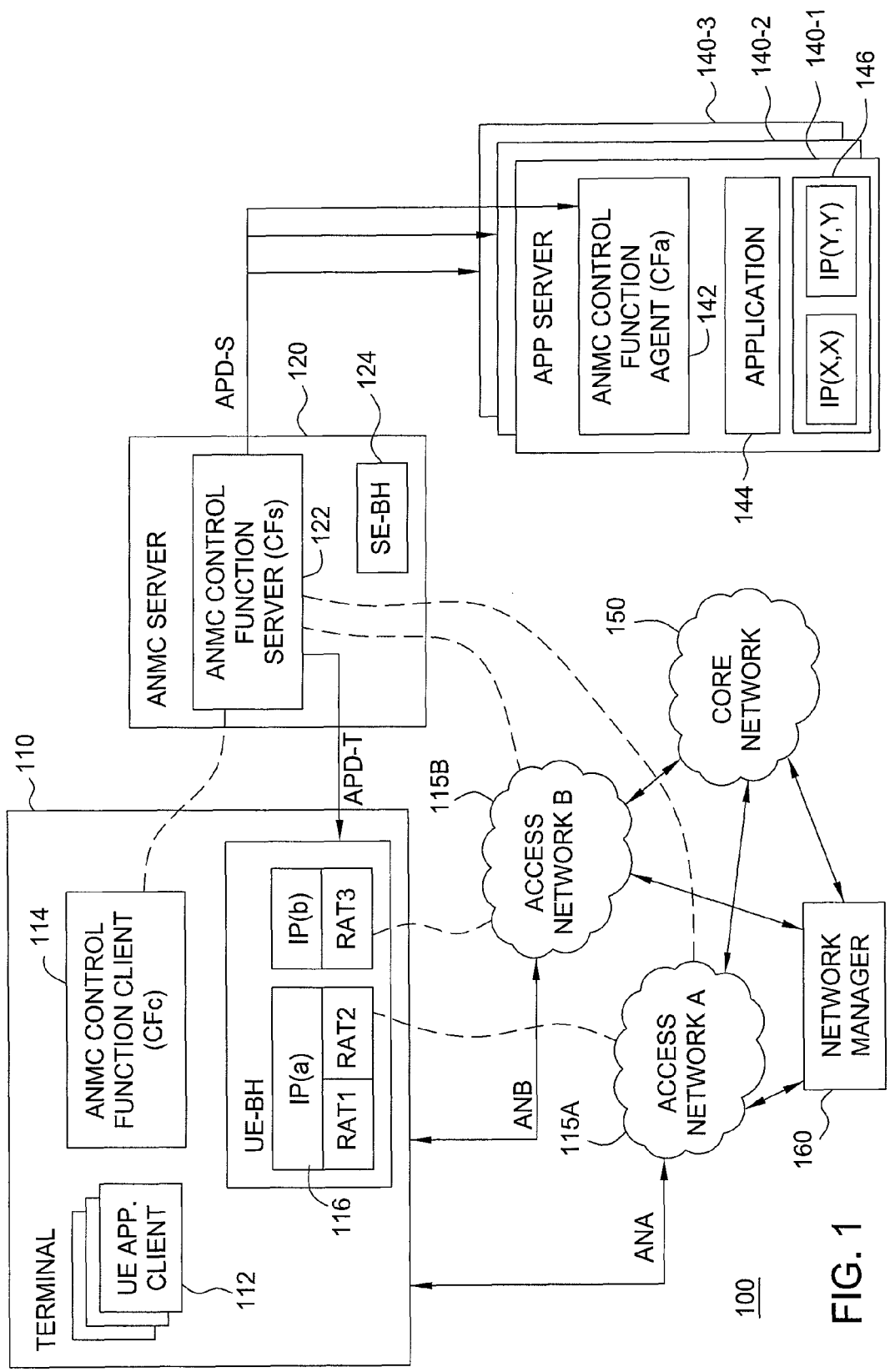
FIG. 1 depicts a high-level block diagram of a system according to one embodiment.

FIG. 1 depicts a high-level block diagram of a system according to one embodiment. Specifically, the system 100 FIG. 1 depicts a single terminal 110 in communication with each of a plurality of access networks 115A, 115B (collectively access networks 115), an access network multi-connectivity (ANMC) server 120, a plurality (illustratively three) of application servers 140, a core network 150 and one or more network managers 160 to manage the various network elements and links forming the various networks discussed herein.

It will be appreciated that while a single terminal 110 is depicted in the system 100 FIG. 1, a typical implementation of such a system would include many terminals 110, where each terminal 110 represents the user equipment (UE) associated with a user or subscriber of a wireless network access provider. The terminals 110 and other user equipment interact with provider equipment (PE) associated with the wireless network access provider, such as eNodeBs, routers, gateways, subnets, servers, managers and the like. The specific access provider equipment used depends upon many factors, including the number and types of access technologies used, the size of the access provider network, the number of subscribers serviced by the access provider, the number of applications supported by the access provider, the geographic scope of the access provider network and so on.

Moreover, it will be appreciated that discussion herein relating to control signaling, bearer traffic and the like is simplified for purposes of clarity. Generally speaking, control signals as well as bearer traffic are communicated between the terminal 110 and ANMC server 120 via one or both of the access networks 115. Generally speaking, the ANMC server 120 communicates with the application servers 140 via a server-side network (not shown) associated with the wireless service access provider, or via the core network 150. In FIG. 1, control signals are generally denoted as dashed lines, while bearer signals are generally denoted as solid lines.

The terminal 110 comprises a network access device capable of using different types of access technologies, such as a smart phone (e.g., iPhone, Blackberry and the like), a net book, a laptop computer, a network access device within an automobile and so on. Generally speaking, the terminal 110 may be implemented using any type of wireless (or wireline) device capable of communicating via multiple types of access technologies, such as provided by access networks 115.

The access networks 115 may comprise any type of access network technology, such as WiFi, UMTS, WiMax, EV-DO, LTE and so on. Each of the access networks 115 facilitate communication between at least the terminal 110 and a core network 150 and/or other network elements and communications with the access networks 115.

The terminal 110 includes a plurality of user equipment (UE) application clients 112, an access network multi-conductivity (ANMC) control function client (CFC) 114, and user equipment bearer handling components (UE-BH) 116.

The UE application clients 112 comprise software executed at the terminal 110 to invoke a specific application, such as a GPS location application, a VoIP application, a video over IP application, a remote television programming application and so on. Each application typically requires interaction between the terminal 110 and various servers, gateways, routers, network elements, other terminals and so on to implement its respective function. The ANMC Control Function Client 114 and the bearer handling components (UE-BH) 116 may be implemented as distinct clients in the UE, as functional entities within the UE Application Client 112, or incorporated in the IP and lower layers within the Operating System kernel.

The ANMC control functions client (CFC) 114 receives control signaling from an ANMC control functions server (CFS) 122 within the ANMC server 120.

The ANMC CFC 114 provides control signaling to one or more of the ANMC CFS 122 of ANMC server 120, and the ANMC control functions agent (CFA) 142 of application servers 140. The control signaling provided by the ANMC CFC 114 includes information related to selected access network, access network state (e.g., congestion levels, error levels and the like) and/or and other operational parameters/characteristics so that applications may adjust their service offerings in response to changes in the type or capability of the access network and/or other networks utilized by the terminal 110.

The UE-BH function 116 comprises the hardware/software within the terminal 110 operable to receive and transmit information via the access networks 115. The UE-BH function 116 conveys control signaling and bearer traffic between the functional elements within the terminal 110 and the external functional elements, such as the ANMC server 120 and application servers 140. It is responsible for bearer handling functions, including the mapping of application packets to and from the correct access network 115.

The access network multi-connectivity (ANMC) server 120 includes an ANMC control functions server (CFS) 122 operable to communicate with the ANMC CFC 114 of terminal 110 and the ANMC control functions agent (CFA) 142 of application servers 140, such as to convey messages from the terminal 110 indicative of changes in radio access technology (RAT) type or capability.

Each of the application servers 140-1, 140-2 and 140-3 (collectively application servers 140) comprises the hardware/software associated with a corresponding application capable of being invoked by an application client 112 in the terminal 110. Application servers 140 may be located with provider equipment (PE) such as the ANMC server 120, located at a network operation center of an application provider or content provider, at each of the plurality of mirror sites serving a user community or specific provider network and so on. Generally speaking, the application servers 140 comprise the equipment, software and firmware necessary to interact with the user via a network to provide thereby application services, content delivery, VoIP services and so on.

Each application server 140 is depicted as including an ANMC control function agent (CFA) 142, an application instance 144 and an application equipment bearer handling function (AE-BH) 146. The ANMC Control Function Agent 142 and Application equipment bearer handling function 146 may be implemented as distinct application components within the Application Server 140, as functional entities within the application 144 providing service to the UE 110 or incorporated in the IP and lower layers within the Operating System kernel on the Application server.

The application 144 interacts with the application client 112 of the terminal 110 to deliver the services associated with the specific application (e.g., location services, VoIP, video and the like). The application equipment bearer handling function (AE-BH) 146 optionally maps packets associated with the traffic flows of the application to the appropriate bearer channels, such as to one or more of access networks 115. The ANMC control function agent (CFA) 142 controls the operation of the application 144 and AE-BH function 146 in conformance with the application services provided to terminals 110 and the ability of the terminals 110, access networks 115 or core networks 150 to support the provided services.

Generally speaking, the application 146 adapts the services provided to the terminal 110 in response to control signaling received by the CFA 142 indicative of the capability or type (or change in capability or type) of the radio access technology (RAT) used by the terminal 110 to support the provided application. The services may be adapted in terms of quality, bandwidth use, encoding technique used, time of delivery, termination (i.e., RAT can no longer support a service) and so on. The adaptation may comprise a change made in the application 144 or in the bearer handling function 146 supporting the delivery of application services. Application server adaptations are made in the transport plane and/or the control plane.

Application preferences may be provided/received via an application programming interface (API) supporting one or more of the application client 112 in the terminal 110 and the Application Server 140. Application preferences may be communicated by other means (e.g., via signaling/control channels or bearer channels). Applications may be offered to subscribers directly from the access provider (so-called "walled garden" applications) or from third party providers (so-called "over-the-top" applications). In either case, the specific application offered to the subscriber may have requirements supportable by relatively low cost or low bit rate networks, requirements necessitating the use of relatively high cost or high bit rate networks, asymmetrical forward/backward bandwidth requirements and the like.

Network operating parameters (e.g., congestion state and/or other indicators) may be received via an API or other means from, illustratively, access network Operations, Administration and Maintenance (OAM) systems (not shown) or network monitoring appliances (not shown). The ANMC Server 120 aggregates congestion information and/or other network operator parameter information from one or more of the available access networks. Based on this information, feedback can be provided to Applications on conditions in the access networks that the Applications can exploit to better delivery services to the end-user.

As described above, the system 100 FIG. 1 includes various functional elements at the terminal, network server and application servers that operate in a particular manner in accordance with service provider policies. This functionality is useful in gathering information related to changes to the type or capability of Radio Access Technology (RAT) selected by the terminal, the application and so on as described.

Application Presence Embodiments

Various embodiments contemplate providing information sufficient to enable mobile terminal presence such that the application is aware of changes in type or function of access network technology used by one or more of the terminals executing the application. In this manner, the application may adapt its application/service offerings or operating parameters to the access network capabilities of the terminals utilizing the application/service.

In various embodiments, the terminal 110 includes within the ANMC control function client 114 a mechanism to detect changes to the type or capability of the access networks supporting a UE application client 112 and, optionally, provide signaling indicative of such change in type or capability of access network. For example, the ANMC control function client 114 may implement a user element radio access technology (UE RAT) control client which operates to monitor any changes to the type or capability of access network supporting a UE application client 112 and ensure that the ANMC server 120, application server 140 or other network elements are aware of such changes, such as informing a content delivery system, IP Multi-Media System (IMS) server, gateway controller or other network element supporting a particular UE or application.

In various embodiments, the ANMC server 120 includes within the ANMC control function server 122 a mechanism to detect changes to the type or capability of access network supporting a UE application client 112 and, optionally, provide signaling indicative of such change in type or capability of access network. For example, the ANMC server 120 may implement a user element radio access technology (UE RAT) control server which operates to monitor any changes to the type or capability of access network supporting a UE application client 112 and ensure that application servers and/or application clients are aware of such changes.

In various embodiments, the application server 140 includes an ANMC control function agent 142 to respond to changes to the type or capability of access network supporting a UE application.

While various functional elements associated with an evolved packet core network are described herein as exemplary components with respect to the invention, it will be appreciated by those skilled in the art that similar components exist with respect to any type of network topology. Thus, the various embodiments are applicable to any type of wireless or wireline network in which the capability or type of access network provided to a terminal or other user equipment may be changed while the terminal or user equipment is executing an application involving services provided via, illustratively, a remote application server.

The various embodiments discussed herein provides several mechanisms by which a remote application server or other service providing element is provided with information relevant to whether or not one of more components within the chain of network elements and links supporting an application provided to the user terminals or equipment remains capable of supporting the application. At times, changes in capability or type of access network provided improvement in QoS. That may entail improvement in on or more aspects of service delivery important to the end user such as available throughput, packet delay, jitter, packet loss, transaction setup delay and other factors that affect the subscriber's quality of experience. When this occurs, it may be appropriate for the service provider to increase the level of service or otherwise enhance the user experience in some manner. The various embodiments also contemplate such enhance service offerings in view of increased capability or improved type of access network.

Generally speaking, changes in access network capability or type are detected by one or more elements within the network and a responsive capability indicative signal is communicated toward the relevant one or more application servers or application clients. The capability indicative signal is configured to enable the application server or application client to responsibly adjust parameters associated with providing service so that the quality of experience (QoE) enjoyed by a user is maintained at a minimum level, enhanced in response to additional access network capability or simply terminated where insufficient access network capability exists.

Figure 2:
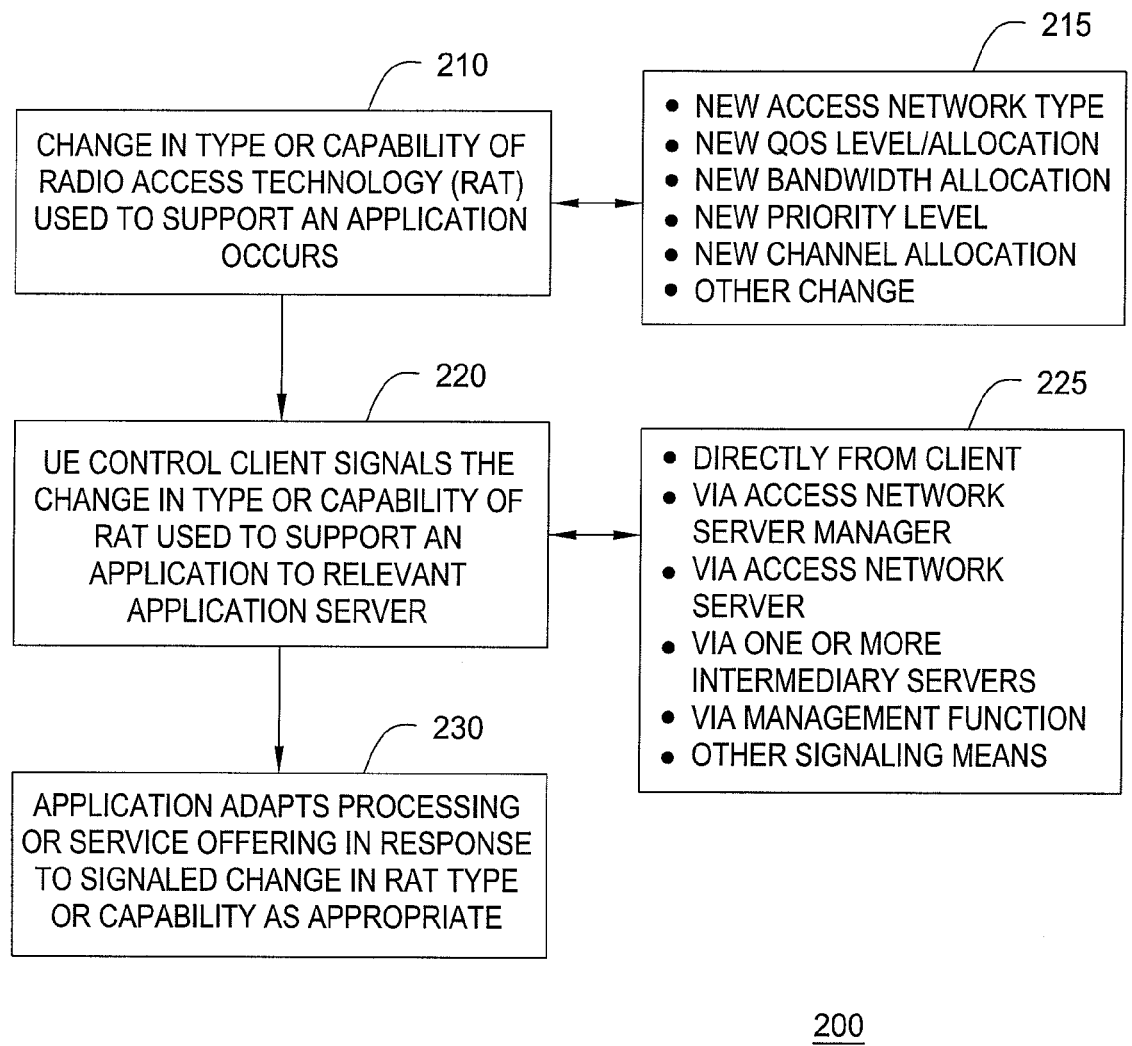
FIG. 2 depicts a flow diagram of a method according to one embodiment.

FIG. 2 depicts a flow diagram of a method according to one embodiment. Specifically, the method 200 of FIG. 2 contemplates that each UE executing a client application transmits to the corresponding application server information indicative of the specific access technology currently in use by the UE so that the application may adapt its processing accordingly.

The method 200 of FIG. 2 will be described within the context of a change in Radio Access Technology (RAT), such as changing from one of wireless access network technology to another wireless access network technologies. In addition to RAT changes, the various embodiments are adapted to changes in capability made within the context of a single RAT, such as changes in allocated bandwidth, QoS level, number/quality of channels, application or user priority level and the like. Generally speaking, the various embodiments note any increase or decrease of capability (allocated, related to error conditions and so on) within the context of a particular access technology, and provide to the relevant application server(s) or application clients information indicative of such changes.

The change in type of capability RAT or, more generally, an access network supporting an application delivered to a UE may be in response to congestion in the access network or other network conditions. In various embodiments, new access networks are selected in response to requests from a user terminal, and application being executed at the terminal, and application servers associate with the user terminal and/or application and so on. Generally speaking, at times the terminal executing the application is aware of the change in type or capability of access network prior to that change. In these instances, the transition between access network types or capability levels may be managed using the explicit signaling of the present embodiments to synchronize the delivery of application services as well as the modifications to such services caused by the changes in type and or capability of access network.

At step 210, a change in type or capability of radio access technology (RAT) used to support an application occurs. Referring to box 215, the change in type or capability may comprising a new access network type, a new QoS level/allocation, a new bandwidth allocation, a new priority level, a new channel allocation and/or some other change.

At step 220, if a change of RAT type or capability has occurred, a control client at the UE signals the change in type or capability of the RAT via an interface at the UE or a server. The interface may be an application programming interface (API) that is accessed by the application. Referring to box 215, the signaling of the change in type or capability of the RAT to the relevant application server is provided directly from client, via access network server manager, via access network server, via one or more intermediary servers in the network, via a management function, or via some other signaling means.

Thus, in one embodiment, the UE signals the application server directly, such as via an API associated with the UE application client 112. In another embodiment, the UE signals the application server indirectly, such as through the ANMC control function server 122. In other embodiments, the UE signals the application server for one of more intermediate servers or via a management function that is associated with the specific access network. For example, in one environment when an access network type is changed, the new access network examines the applications being executed by the UE and responsibly signaled the type and/or capability of the new access network to the relevant application server.

At step 230, the application adapts its processing or service offering in response to the explicitly signaled information indicative of the change of RAT type or capability, as appropriate. Depending upon the change in type or capability of RAT, this adaptation may comprise increasing or decreasing the bandwidth associated with the application, terminating the application (e.g., where resources are now insufficient to support the application), migrating the application to another application server and so on.

Various adaptations of applications are contemplated within the context of the present embodiments. Generally speaking, an application may alter its service and/or transport aspects according to the received RAT information.

Where an application server receives a communication indicative of an increase in access network capability, the application server may responsively increase a service-level associated with the application. This increase in service-level may comprise, illustratively, higher resolution video imagery, higher-quality audio connection, improved quality encoding or decoding functions, increase use of bandwidth to support ancillary functions such as meta-data streaming, advertising and the like.

Where an application server receives a communication indicative of a decrease in access network capability, the application server may responsively decrease a service-level associated with the application. Alternatively, the application server may simply terminate the application, such as when the new capability level is below a minimum or threshold level of capability deemed necessary to support the application.

Several exemplary application alterations are provided below, though more and varied applications will be appreciated by those skilled in the art and informed by the teaching of the present embodiments.

An email server may scale the size of the attachments it will send to devices according to the access technology. For example, attachments <1 MB may be sent on GPRS, <5 MB on UMTS, <10 MB on LTE and unlimited on 3GPP WLAN.

A Video Telephony (VT) service may offer only audio capability when the UE is connected to GPRS and UMTS, with full VT service only on LTE and WLAN.

The existence of multiple, simultaneous connections can be used by the application to setup backup transport paths. This is particularly useful for applications requiring high reliability within the health care and security domains.

Selection of initial codec rates for video streaming or download could be made according to the access technology. GPRS would have the lowest rate selected, with increasing rates supported by UMTS, LTE and 3GPP WLAN.

A content push decision may be made based on the access technology. For example, no content would be pushed when on GPRS, low resolution content could be pushed when on UMTS, medium resolution on LTE and high resolution on 3GPP WLAN.

While discussed herein with respect to radio access technology, it will be appreciated that any changes to access network capability or type they be utilized within the context of the various embodiments. Moreover, where multiple access networks are combined in parallel or series to support UE access to an application, changes in capability or type of any of these access networks may be detected and communicated to the application server for subsequent service-level modification or adaptation.

Figure 3:
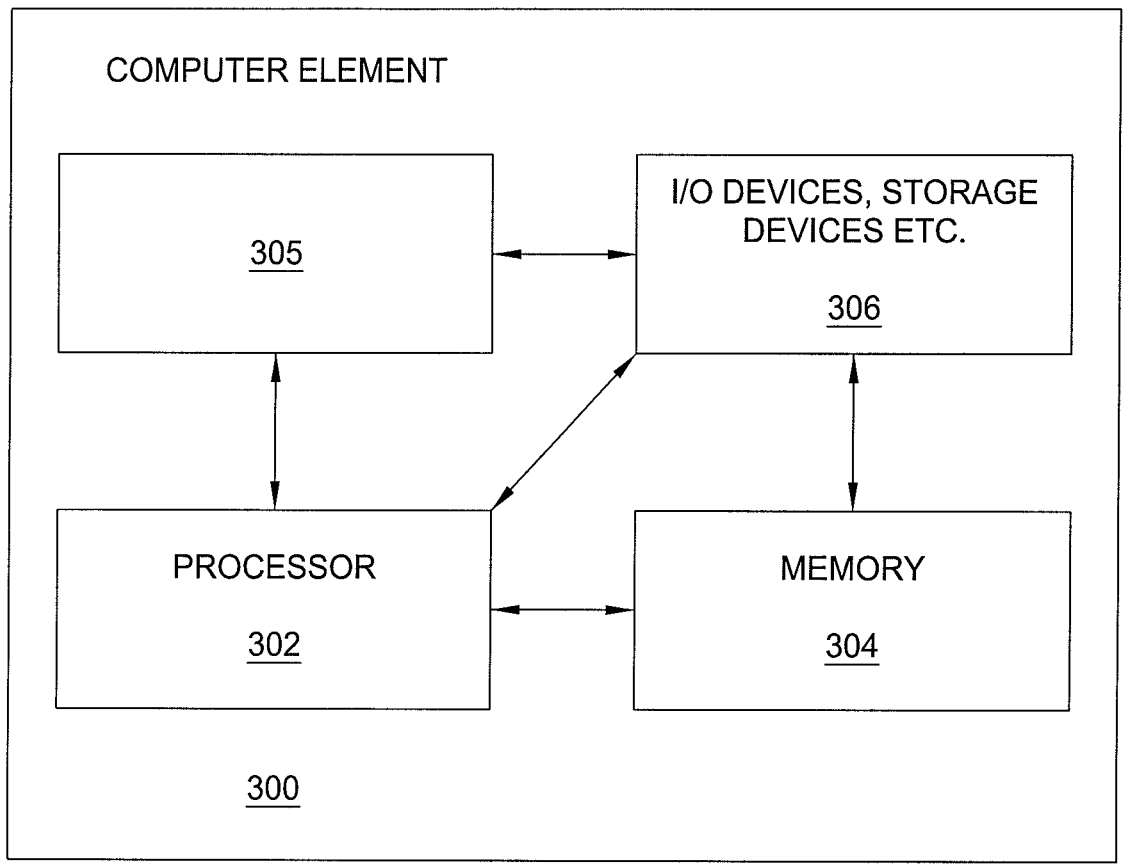
FIG. 3 depicts a high-level block diagram of a computer suitable for use in performing the functions described herein.

FIG. 3 depicts a high-level block diagram of a computer (computing element) suitable for use in performing the functions described herein. Specifically, the computer 300 depicted in FIG. 3 provides a general architecture and functionality suitable for implementing at least portions of user equipment (such as terminal 110), provider equipment (such as ANMC server 120) and application equipment (such as application servers 140).

As depicted in FIG. 3, computing element 300 includes various cooperating elements, including a processor element 302 (e.g., a central processing unit (CPU) and/or other suitable processor(s)), a memory 304 (e.g., random access memory (RAM), read only memory (ROM), and the like) and various input/output devices 306 (e.g., a user input device (such as a keyboard, a keypad, a mouse, and the like), a user output device (such as a display, a speaker, and the like), an input port, an output port, a receiver/transmitter (e.g., an air card or other suitable type of receiver/transmitter), and storage devices (e.g., a hard disk drive, a compact disk drive, an optical disk drive, and the like)). FIG. 3 also depicts a further cooperating element 305 that may be used to augment the functionality of the processor(s) 302, memory 304 and I/O devices 306 or to implement any of the various or additional functions as described herein. In various alternate embodiments, cooperating element 305 may comprise a control function client, control function server, control function agent, bearer function, management function and the like.

It should be noted that functions depicted and described herein may be implemented in software and/or in a combination of software and hardware, e.g., using a general purpose computer, one or more application specific integrated circuits (ASIC), and/or any other hardware equivalents. In one embodiment, software implementing methodology or mechanisms supporting the various embodiments is loaded into memory 304 and executed by processor(s) 302 to implement the functions as discussed herein. Thus, various methodologies and functions (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a tangible or intangible broadcast or other signal bearing medium, and/or stored within a memory within a computing device operating according to the instructions.

The various embodiments provide a mechanism to control how applications interact with service provider networks using access network information that is not currently available to applications. The embodiments also give applications the ability to explicitly adapt their processing according to the access technology selected by a multi-access technology capable device. By optimizing service selection and transport aspects of service delivery according to the access technology capabilities, applications can improve the customer experience, helping to ensure the success of the applications. For applications managed by wireless service providers, this invention gives them control over the impact those applications will have on the access networks. The control may enable applications which might otherwise be banned from the network because of their impact when on legacy access technologies.

The above-described teachings and embodiments provided herein, such as methods, apparatus, systems and the like for providing network aware presence, may be adapted in various combinations with the teachings and embodiments such as methods, apparatus, systems and the like for providing controlling access technology selection disclosed in U.S. patent application Ser. No. 12/705,212, which is entitled "Method And Apparatus For Controlling Access Technology Selection," and which is herein incorporated by reference in its entirety.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for controlling application services provided to a user equipment (UE), comprising:
   detecting, at the UE, a change of at least one of a type or a capability of an access network supporting delivery of application services to the UE;
   communicating a first indication of the change from the UE toward a first application server via a server, the first application server hosting a first application delivering first application services to a first application client of the UE, the first indication adapted for use by the first application server or the first application to responsively modify the first delivered application services of the first application hosted on the first application server; and
   communicating a second indication of the change from the UE toward a second application server via an Application Programming Interface (API) of the UE that is independent of the server, the second application server hosting a second application delivering second application services to a second application client of the UE, the second indication adapted for use by the second application server or the second application to responsively modify the second delivered application services of the second application hosted on the second application server.

2. The method of claim 1, wherein the change comprises at least one of:
   selection of a different wireless access network for the UE; or
   one or more of a new quality of service (QoS) allocation, a new bandwidth allocation, a new priority level, or a new channel allocation.

3. The method of claim 1, wherein the server is an access network server.

4. The method of claim 1, wherein the server is an intermediary server.

5. The method of claim 1, wherein the server is a network server.

6. The method of claim 1, further comprising:
   detecting the change at an access network server.

7. The method of claim 1, wherein the access network comprises at least one of a WiFi based access network, a GPRS based access network, a UMTS based access network, a WiMax based access network, an EV-DO based access network, or a LTE based access network.

8. The method of claim 1, further comprising adapting a service offering of the first application server in response to the first indication of change or a service offering of the second application server in response to the second indication of the change, wherein said adapting comprises increasing a service level in response to an increase of access network capability or decreasing a service level in response to a decrease of access network capability.

9. The method of claim 1, further comprising:
   terminating the first application or the second application in response to network capability below a threshold level.

10. The method of claim 1, wherein the change is detected by an access network control function client of the UE and the first indication of the change is communicated from the access network control function client of the UE toward an access network control function agent of the first application server.

11. The method of claim 1, wherein the change is detected by an access network control function client of the UE and the second indication of the change is communicated from the access network control function client of the UE toward an access network control function agent of the second application server.

12. An apparatus for controlling application services provided to a user equipment (UE), comprising:
   a processor and a memory communicatively coupled to the processor, the processor configured to:
      detect, at the UE, a change of at least one of a type or a capability of an access network supporting delivery of application services to the UE;
      communicate a first indication of the change from the UE toward a first application server via a server, the first application server hosting a first application delivering first application services to a first application client of the UE, the first indication adapted for use by the first application server or the first application to responsively modify the first delivered application services of the first application hosted on the first application server; and
      communicate a second indication of the change from the UE toward a second application server via an Application Programming Interface (API) of the UE that is independent of the server, the second application server hosting a second application delivering second application services to a second application client of the UE, the second indication adapted for use by the second application server or the second application to responsively modify the second delivered application services of the second application hosted on the second application server.

13. The apparatus of claim 12, wherein the change is detected by an access network control function client of the UE and the first indication of the change is communicated from the access network control function client of the UE toward an access network control function agent of the first application server.

14. The apparatus of claim 12, wherein the change is detected by an access network control function client of the UE and the second indication of the change is communicated from the access network control function client of the UE toward an access network control function agent of the second application server.

15. The apparatus of claim 12, wherein the server is an access network server.

16. The apparatus of claim 12, wherein the Server is an intermediary server.

17. The apparatus of claim 12, wherein the server is a network server.

18. The apparatus of claim 12, wherein the change in capability comprises at least one of:
   selection of a different wireless access network; or
   one or more of a new quality of service (QoS) allocation, a new bandwidth allocation, a new priority level, or a new channel allocation.

19. The apparatus of claim 12, wherein the access network comprises at least one of a WiFi based access network, a GPRS based access network, a UMTS based access network, a WiMax based access network, an EV-DO based access network, or a LTE based access network.

20. A non-transitory computer readable storage medium storing instructions which, when executed by a processor, cause the processor to perform a method for controlling application services provided to a user equipment (UE), the method comprising:
   detecting, at the UE, a change of at least one of a type or a capability of an access network supporting delivery of application services to the UE;
   communicating a first indication of the change from the UE toward a first application server via a server, the first application server hosting a first application delivering first application services to a first application client of the UE, the first indication adapted for use by the first application server or the first application to responsively modify the first delivered application services of the first application hosted on the first application server; and
   communicating a second indication of the change from the UE toward a second application server via an Application Programming Interface (API) of the UE that is independent of the server, the second application server hosting a second application delivering second application services to a second application client of the UE, the second indication adapted for use by the second application server or the second application to responsively modify the second delivered application services of the second application hosted on the second application server.

* * * * *